United States Patent [19]

Wolf

[11] 4,141,284

[45] Feb. 27, 1979

[54] TWO STAGE POWER VALVE

[75] Inventor: Peter Wolf, Baroda, Mich.

[73] Assignee: Auto Specialites Manufacturing Company, St. Joseph, Mich.

[21] Appl. No.: 832,556

[22] Filed: Sep. 12, 1977

[51] Int. Cl.² .............................................. F15B 11/20
[52] U.S. Cl. .................................... 91/532; 60/547 B; 60/548; 60/550; 60/494
[58] Field of Search .................... 91/412, 434, 468; 60/403, 422, 494, 548, 550, 591; 303/52

[56] References Cited

U.S. PATENT DOCUMENTS

| 3,298,177 | 1/1967 | Kellogg | 60/548 |
| 3,827,765 | 8/1974 | Husted | 303/52 |
| 3,900,229 | 8/1975 | Husted | 303/52 |

Primary Examiner—Edgar W. Geoghegan
Attorney, Agent, or Firm—Olson, Trexler, Wolters, Bushnell & Fosse, Ltd.

[57] ABSTRACT

A power brake valve and a related braking system are disclosed. The valve comprises a housing defining a first bore of large diameter and a second bore of smaller diameter, and annular pistons are slidably disposed within each bore. A biended rod, also slidable within the bores, carries reaction pistons which are radially extended to cover the annular flow space of the adjacent, associated annular pistons. When the rod is pulled in a power mode of operation, each annular piston moves toward the associated annular piston to restrict and halt the normal flow of fluid through the annular piston and create a movable end wall. As pressure rises within the chambers, pressurized fluid is discharged from the valve to brake units to cause braking action. In a manual mode of operation, pulling action on the rod causes a relatively large quantity of relatively low pressure fluid to be discharged from the first chamber so as to quickly and effectively take up systemic clearances within the brake system. Further pulling action on the rod causes a relatively small quantity of relatively high pressure fluid to be ejected from the second chamber to cause effective braking action without overextended brake pedal movement.

25 Claims, 5 Drawing Figures

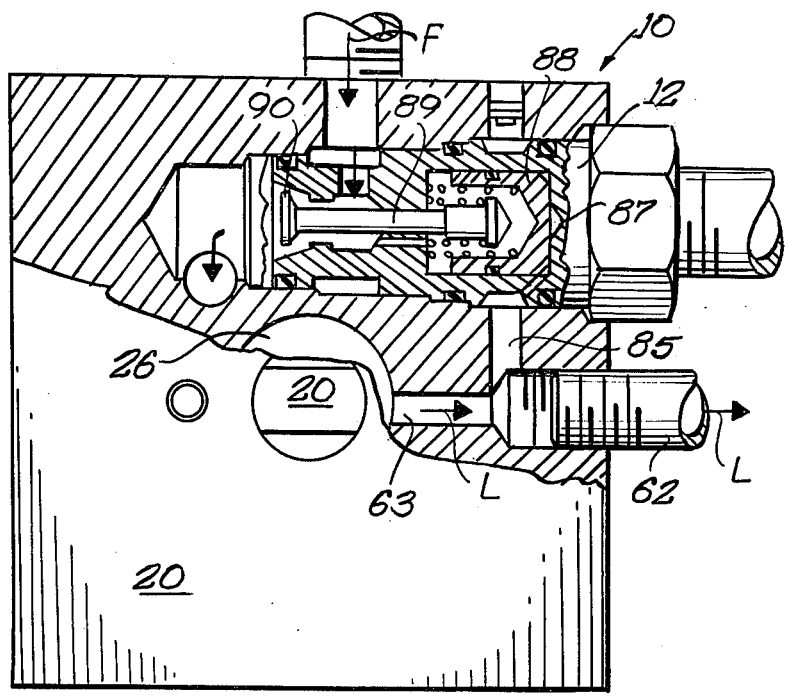
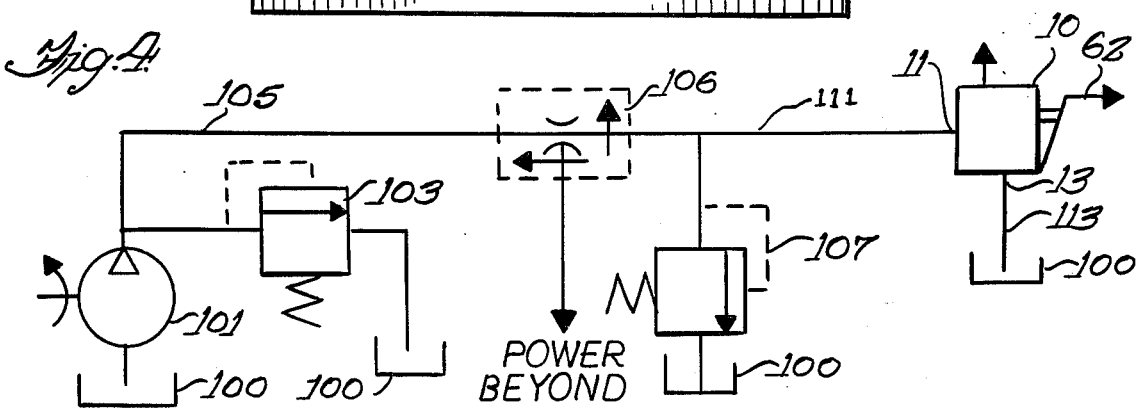
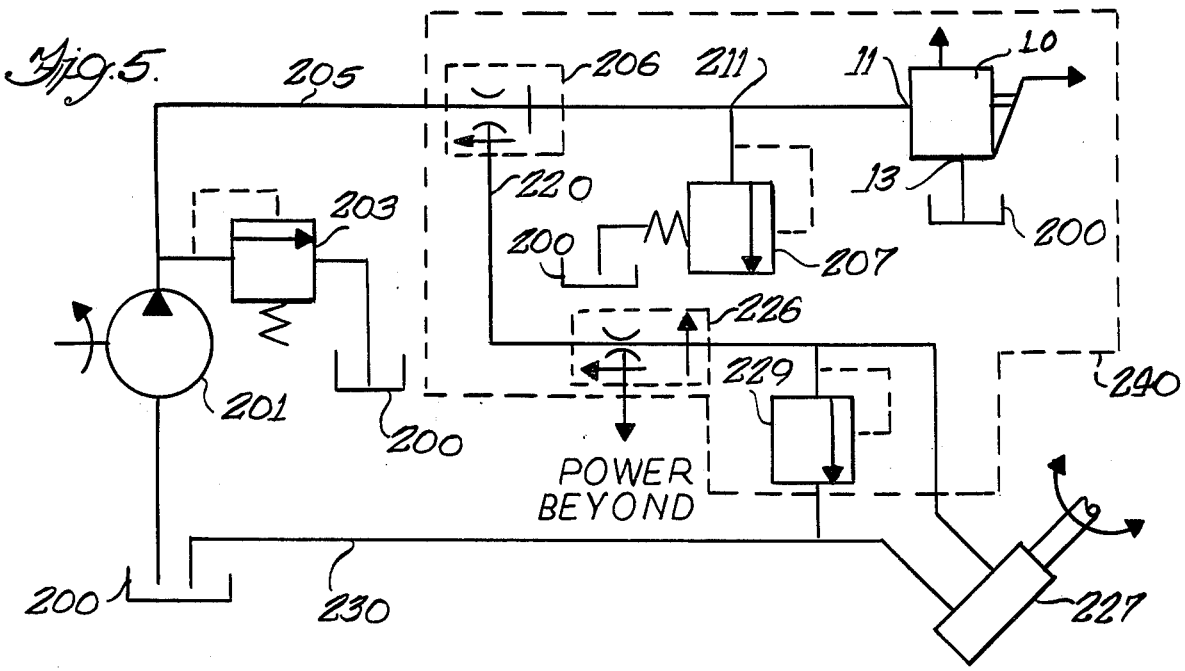

TWO STAGE POWER VALVE

BACKGROUND OF THE INVENTION

This invention relates generally to brake valves and accompanying brake systems, and more particularly concerns a valve having both power and manual modes for use in large or complex hydraulic brake systems.

Brake control valves such as those described in U.S. Pat. Nos. 3,827,765 and 3,900,229 are increasingly used for actuating brake systems of relatively large size or relatively complex nature. Brake systems such as these are especially attractive when offered on off-highway equipment such as farm tractors, mining equipment, front-end loaders, cranes, road rollers, and the like. The actuator valves for these brake systems commonly can be operated in either a "power" mode or a manually actuated mode.

It is important to operators of such equipment that the brake systems on their equipment provide powerful but smooth pressure modulation in order that braking can be applied with maximum accuracy and predictability. Good modulation means good "feel" at the brake pedal, and good "feel" permits the experienced operator to obtain maximum performance from his equipment.

When the brake system is being operated in its power mode, brake fluid is pressurized and then supplied to the brake units from a pressurized fluid source such as a pump. The power valve acts as a brake fluid pressure and flow modulator.

When the brake system is being operated in the manual mode, the power valve acts as both a fluid pressurizer and as a fluid pressure modulator. To pressurize and modulate, valves such as those described in the U.S. Pat. Nos. 3,827,765 and 3,900,229 patents include a bore in which slides a piston, forming a collapsible chamber. When the piston is moved by a connected brake foot pedal or other actuator, fluid is pressurized and delivered to the brake units to cause braking action.

Until now, the brake design engineer has been faced with something of a dilemma in selecting a brake valve with desirable manual mode pressurizing and modulating characteristics. A large-diameter valve piston and correspondingly large diameter fluid pressurizing collapsible chamber can be provided, in order that only short brake pedal travel be necessary to displace relatively large volumes of fluid. These large-volume fluid charges quickly take up clearances in the brake units and move the brake shoes or pads into contact with the mating brake surfaces. However, relatively large pedal forces are then required to apply adequate braking pressure to the fluid and brake units through the valve.

On the other hand, a relatively small diameter piston and correspondingly small diameter collapsible valve chamber provide the high brake pressure desirable for powerful braking action, but relatively long pedal movement or stroke is required if the valve is used with high fluid volume brake units or large braking systems.

It is the general object of the present invention to provide the advantages of both a large-piston, large-cylinder and a small-piston, small-cylinder brake valve in but a single unit, while eliminating the described disadvantages of both the small-piston and large-piston unit.

Another object is to provide a brake system valve of the type described which is reliable and rugged in operation, and which will provide a relatively long service life without extensive maintenance requirements.

Yet another object is to provide a brake valve of the type described which can be offered at a commercially attractive price.

A further object is to provide a brake system which utilizes the features of this valve to maximum advantage. An related object is to provide such a system in which many system components can be carried in or upon the valve itself for ease of servicing.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 3 is an end elevational view of the valve of FIGS. 1 and 2 in partial section and showing further details of the valve;

FIG. 4 is a schematic diagram showing the valve and a related brake system; and

FIG. 5 is a schematic diagram similar to FIG. 4 but showing the valve used in a brake system of slightly modified design.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
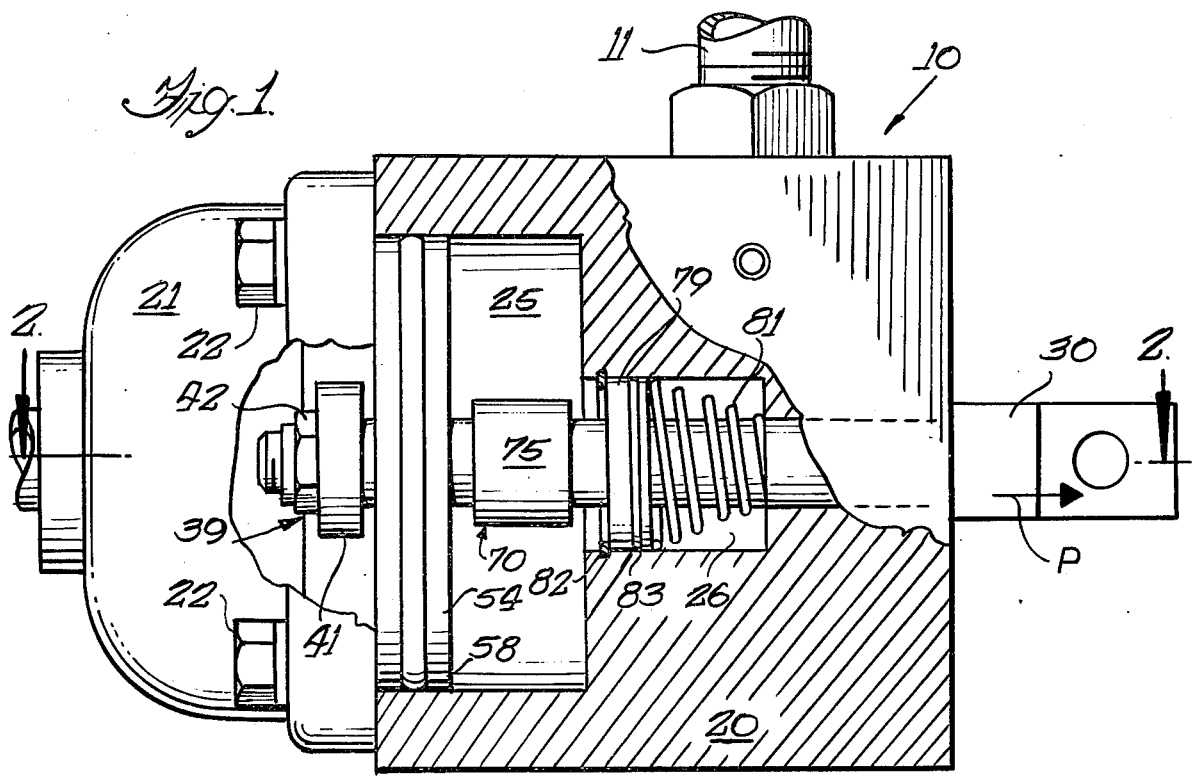
FIG. 1 is a side elevational view in partial section of a brake valve embodying the present invention.
Figure 2:
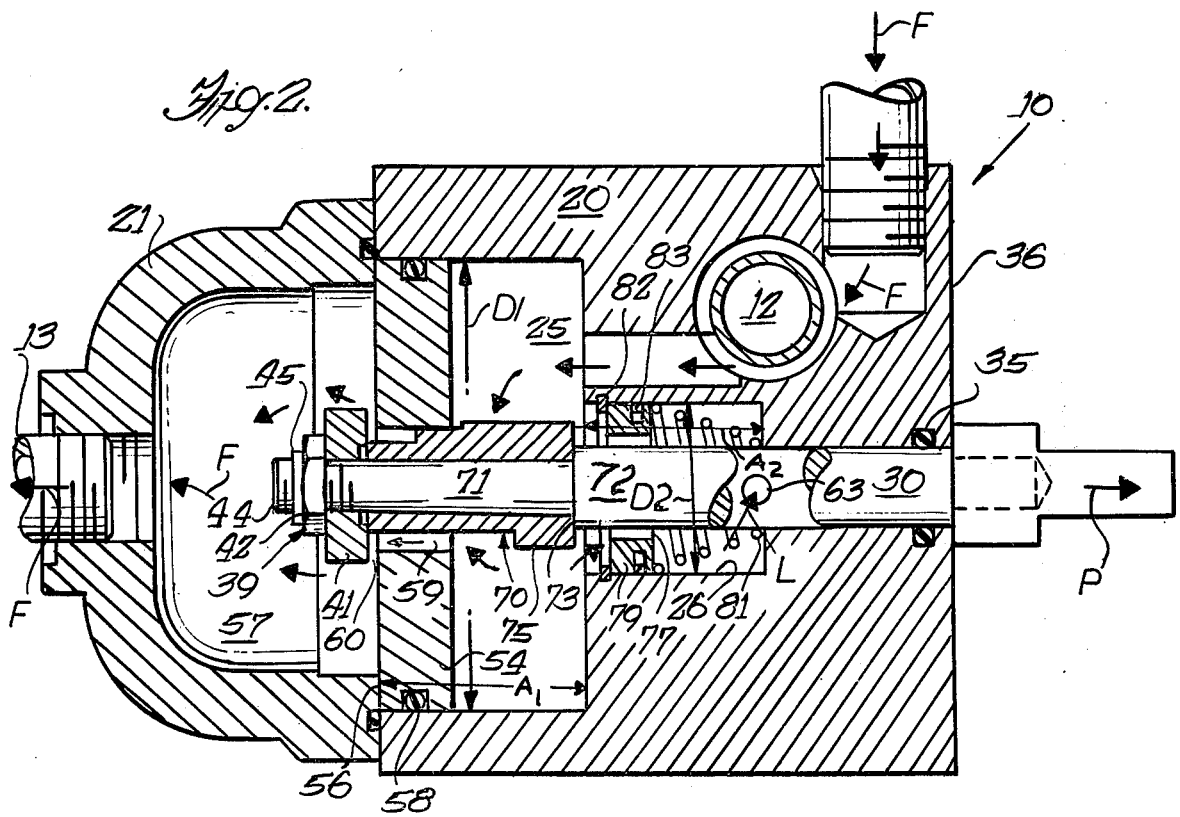
FIG. 2 is a sectional view taken substantially in the plane of line 2—2 in FIG. 1.

Turning more specifically to FIGS. 1-3, there is shown a brake master valve 10. It is contemplated that brake fluid of a liquid type will be supplied to a brake inlet 11 from a source of pressurized fluid such as the brake fluid pump described below. When the valve and system are operating in the power mode the brake pump continually pumps fluid at a given pressure through the valve 10 via the inlet port 11, a communicating pilot-to-open-check valve 12, and an outlet port 13 as shown by the arrows F. The fluid then returns to a reservoir (also described below) for re-routing to the pump.

When the system is operating in its power mode and when the brakes are to be actuated, the system operator appropriately sets a brake operator device. Commonly, this brake operator device can be a brake foot pedal which is depressed in known manner. When this happens, pressurized fluid flow is diverted by the valve 10 to the appropriate brake units and other system components.

The brake valve 10 itself includes a housing 20 to which is secured a cap 21 by any convenient means such as bolts 22. The housing 20 defines a relatively large-diameter short-axial-length low pressure chamber 25, and, coaxial with the low pressure chamber 25 but axially spaced apart therefrom, a relatively small diameter high pressure chamber 26. When the operator desires to actuate the brakes of his equipment, he operates an actuator, commonly a brake foot pedal (not shown). The pedal is connected to a valve actuator rod 30 for pulling action to the right, as indicated by the arrow P in FIGS. 1 and 2. To prevent fluid escape around the sides of the rod 30, a seal 35 can be included at a working end 36 of the housing 20.

A piston rod end 39 disposed within the valve 10 carries a relatively small reaction piston 41. To secure the reaction piston in place, a security nut 42 can be turned against the reaction piston 41 along threads 44. A safety device such as a cotter pin 45 is here included to insure that the piston 41 is retained upon the rod end 39.

A movable pressure-and flow-regulating barrier is provided within the valve by an annular piston 54 of relatively large diameter carried within the first or low pressure bore 25. Normal fluid flow F through the valve normally urges this annular piston 54 against an annular shoulder or seat 56 formed at one end of the chamber 25. Here, this seat 56 is inexpensively created by providing a recess 57 in the cap 21 with an internal diameter smaller than the internal diameter of the low pressure chamber 25. Fluid leakage around the outside of the piston 54 is discouraged by an appropriate seal 58.

When the brake valve is in its normal or brake-deactivated condition, the reaction piston 41 and the annular piston 54 are not engaged, and fluid flow F occurs through the annular piston 54 via an annular flow space 59, thence around the outside of the reaction piston 41, and out of the valve through the outlet port 13.

It will be noted that the relative locations of the reaction piston 41 and the annular piston 54 effectively from a flow orifice 60 of variable size. When the rod 30 is pulled as indicated by the arrow P, the reaction piston 41 is drawn toward the annular piston 54, thereby restricting the orifice 60. Corresponding restriction of normal fluid flow causes fluid pressure to rise in the chambers 25 and 26, and closes the check valve 12 to prevent back-up fluid pressure rise in the inlet line. Continued rod pulling action and size reduction of the variable orifice 60 causes the pump and chambers 25 and 26 to deliver a charge of pressurized fluid to a brake line outlet 62, (FIG. 3) via a small bore 63 and accordingly charge brake units (not shown) to effect braking action. Release of pulling action on the valve rod 30 permits the increased pressure within the chambers 25 and 26 to force the reaction piston 41 away from the annular piston 54 and again provide fluid flow F through the valve, thereby releasing the brakes. Control of the size of the orifice 60 by the reaction piston 41 and rod 30 controls braking action with sensitive "feel."

When fluid flow to the valve is not provided (because pressure pump actuation is deliberately or accidently halted, or for other reasons) the valve 10 can nevertheless be operated in its manual mode. When a pulling action P is applied to the valve rod 30, the reaction piston 41 engages the annular piston 54, and further pulling action causes both pistons 41 and 54 to be moved toward the right as shown in FIGS. 1 and 2.

In accordance with one aspect of the invention, the valve 10 provides short brake pedal stroke but sensitive braking action even in its manual operating mode. To this end, the valve first provides a relatively large charge of relatively low pressure fluid to the brakes so as to rapidly and effectively take up any brake unit clearances or symstemic fluid voids with relatively little operator effort. To accomplish this first action, fluid is delivered from the low pressure chamber 25 to the brake units via the brake unit output line 62 via a small bore 63 (FIG. 3). To provide the relatively large quantity of relatively low pressure fluid required in this regard, the low pressure chamber 25 is formed so as to be provided with a relatively large diameter $D_1$ in comparison to its axial length $A_1$. Movement of the pistons 41 and 54 to the right as indicated in FIG. 2 thus discharges the relatively large amount of fluid along the bore 63 and then out the brake port 62 along the flow path indicated by the arrows L.

In accordance with another aspect of the invention, the valve 10 next delivers a relatively small amount of fluid at a relatively high pressure to quickly and effectively pressurize the brake units and deliver effective braking action — and does so without requiring excessively high brake operator force or heavy pulling action P. To this end, a brake sealing sleeve 70 is provided upon the rod 30. To properly axially locate this sleeve 70, the rod 30 is provided with a reduced-diameter portion 71 extending over that part of its axial length which is adjacent the piston end 39. The small-diameter rod portion 71 and a co-axial large-diameter rod portion 72 thus provide an annular shoulder 73 against which the sleeve 70 can be forced to abut by the reaction piston 41 and accompanying safety nut 42.

To restrict fluid flow from the high pressure chamber 26 during high pressurization operation, the sleeve 70 includes an extended-diameter head 75 which is large enough to effectively cover an annular flow space 77 provided between the expanded-radius portion 72 of the rod 30 and an annular high pressure chamber piston 79. As the rod 30 is continually drawn to the right in the direction of the arrow P as shown in FIG. 2, the annular high pressure flow space 77 is covered and effectively stoppered by the sleeve collar 75.

In carrying out the invention after the brake system has been preliminarily pressurized, the brake unit 10 delivers to the brake system a relatively small quantity of relatively high pressure fluid so as to properly energize the brakes and cause braking action. To this end, the high pressure chamber 26 is formed so as to have a relatively small diameter $D_2$ as compared to its axial length $A_2$.

As further pulling action P is caused by the brake system operator on the rod 30, the sleeve head 75 engages the high pressure piston 79 and further pulling action causes both the brake sleeve 70 and piston 79 to move to the right, as indicated in FIGS. 2 and 3. Since the annular piston 79 and accompanying sleeve 70 in effect provide a movable wall of relatively small facial area, a relatively low force is required to provide the pulling action P necessary to move the piston 79 to the right and expel a fluid charge from the high pressure chamber 26 into the brake system via the bore 63. When brake pulling action is released, a biasing device such as a conically coiled return spring 81 again urges the high pressure annular piston 79 to be re-set in its original position. A retaining device such as a snap ring 82 prevents the piston 79 from being dislodged from the high pressure chamber 26. An appropriate O-ring seal 83 prevents fluid leakage past the annular piston 79.

It will be noted that continued pulling action P tends to raise the pressure not only in the high pressure chamber 26, but also to further raise the pressure in the low pressure chamber 25. To prevent pressure build up in the low pressure chamber 25 when pressurizing the high pressure chamber 26, and to thereby lower the requisite forces required to produce the pulling action P, fluid pressure can be routed through a pilot passage 85 (FIG. 3) to actuate the check valve 12. Here, high pressure fluid traveling up the pilot passage 85 charges a small chamber 87 adjacent a normally seated check valve cap piston 88. When this chamber is so charged, the cap piston 88 moves to the left, as shown in FIG. 3, thereby depressing the check valve stem 89 and unseating the valve 90 itself. When the check valve is thus unseated, a small amount of fluid is permitted to flow from the chamber 25 back up the inlet line 11, thereby relieving the pressure in the low pressure chamber 25 and effectively temporarily dropping the low pressure chamber pressure to ambient or atmospheric pressure.

At the same instant the inlet check valve 12 opens, the sealing sleeve collar 75 resumes its seal against the high pressure annular piston 79 due to the drop in the pressure in the low pressure chamber 25. Further pulling action P on the rod 30 then continues to increase the brake pressure in the high pressure chamber 26 and through the brake port 63. In sequence, then, a large displacement of fluid has been discharged to the brakes with little pedal travel, and thereafter the fluid in the brake system is charged to a high pressure without excessive pedal force.

It is another feature of the invention that use of this valve 10 can permit great simplification of associated equipment hydraulic and braking systems. As illustrated in FIG. 4, fluid can be drawn from a reservoir 100 by a pump 101. An appropriate relief valve 103 provides an upper limit to the fluid pressure which the pump imposes upon a header line 105. A priority control 106 insures that the brake unit 10 will be supplied with adequate fluid pressure and volume before other hydraulically operated mechanisms, indicated as "Power Beyond" devices, are energized. Another pressure relief valve 107 insures that a maximum pressure is not exceeded in the line 111 leading to the brake valve 10. Fluid exhausted from the valve 10 is discharged through an outlet port 13 to the reservoir 100 by a return line 113. This return line 113 leads directly to the reservoir 100 to minimize back pressure on the valve 10 and consequently upon the brake unit (not shown). In this way, back pressure inadvertently applied to the brake units can be minimized, and brake drag correspondingly minimized.

Another brake and hydraulic system is illustrated in FIG. 5. Here again, fluid is drawn from a reservoir 200 by a pump 201 and is discharged to a header line 205. Again, a pressure relief valve 203 imposes a maximum pressure limit upon the fluid in the line 205. A priority control device 206 insures that correct fluid quantities and pressures are always delivered to a downstream line 211 so as to insure proper charging of the brake valve 10 through its inlet port 11. Again, a return line 213 leads from the valve exhaust port 13 to the reservoir 200 along a short, direct route. As in the system illustrated in FIG. 4, another pressure relief valve 207 insures that the brake valve 10 is not over-pressurized or over-charged.

So long as the priority control 206 has insured that proper fluid quantities and pressures are being delivered to the brake valve 10, fluid is delivered to a secondary line 220 leading from the first priority control 206. A secondary priority control device 226 insures that proper fluid pressures and quantities are delivered to a power steering mechanism 227 before fluid pressure or charges are delivered to other "Power Beyond" mechanisms. A pressure relief valve 229 insures that the power steering mechanisms 227 is not over-pressurized. Again, fluid can be delivered from the power steering mechanisms 227 to the reservoir 200 by a return line 230.

It will be understood that, to simplify fluid circuitry, some or all of these priority flow controls and pressure regulating devices can be carried upon or within the basic valve body 20. For example, all those portions of the system shown in FIG. 5 which are included within the indicated box diagram 240 can be physically located on or within the valve body 20. The remaining portions of the hydraulic and brake system which must be mounted elsewhere upon the vehicle or equipment are thus minimized. In this way, the illustrated system can be serviced with relative ease, and can be constructed with but minimal plumbing.

The invention is claimed as follows:

1. A power brake valve comprising a housing defining a first bore of given diameter and a second bore having a smaller diameter than the first bore and located axially adjacent to the first bore, a bi-ended rod slidable with respect to the bores, an apertured annular piston slidably disposed within each bore, the aperture defined by each annular piston including a flow space normally permitting power fluid to flow through the annular piston, a plurality of reaction pistons carried on the rod, each reaction piston radially extending to cover the flow space of an adjacent, associated annular piston and to move toward that associated annular piston to restrict and halt the normal flow of fluid through the associated annular piston and create a movable end wall, each movable end wall and immediately surrounding bore defining a collapsible chamber in the power valve, the power valve further including a fluid output port communicating with at least one collapsible chamber to direct power fluid from the collapsible chamber toward a brake actuating means when the chamber is collapsed.

2. A power brake valve according to claim 1 wherein is defined an orifice between each said annular piston and its said associated reaction piston, rod movement in a given direction acting to close the orifices and raise the fluid pressures within each said defined collapsible chamber.

3. A power brake valve according to claim 2 including exhaust port means extending from a collapsible chamber toward a low pressure fluid receiver, to permit fluid to move through at least one valve collapsible chamber and open orifices, when the reaction pistons and associated annular pistons are spaced apart from one another, so as to deliver fluid from the chamber directly to the low pressure receiver without energizing the brake actuating means under normal conditions.

4. A power brake valve according to claim 1 wherein said valve rod extends through at least one said annular piston to define, between the annular piston and the rod, said annular flow space.

5. A power brake valve according to claim 4 wherein said valve rod extends through each annular piston to define, between each annular piston and the rod, said corresponding annular flow spaces.

6. A power brake valve according to claim 1 including output port means defining a brake port flow passage in the housing leading directly from the small diameter chamber toward a brake unit.

7. A power brake valve according to claim 1 including spacer means located between two adjacent annular pistons and having an axial length sufficient to space apart the adjacent annular pistons from one another at a minimum axial distance different than the distance at which the respective associate annular pistons are normally axially spaced apart, whereby to cause the respective reaction pistons and associated annular pistons to close and form collapsible walls in sequential order, whereby to deliver to the output port a first quantity of fluid at a relatively low pressure, and thereafter deliver to the output port a second quantity of fluid at a relatively high pressure.

8. A power brake valve according to claim 7 wherein said spacer means is shorter than the normal axial distance between said annular pistons so as to close said low pressure, large diameter chamber before the high pressure, small diameter chamber is closed.

9. A power brake according to claim 1 wherein said rod extends through each said annular piston and said reaction piston whereby to provide a valve of compact size and shape.

10. A power brake valve according to claim 1 including a cap having a recess defining an internal diameter different than the diameter of the low pressure chamber formed in the housing, the cap being carried coaxially upon the housing to form an annular step against which the low pressure, large diameter annular piston normally rests, and snap ring means carried in the small diameter, high pressure chamber to form stop means against which the high pressure annular piston normally rests.

11. A power brake valve according to claim 1 including resilient biasing means carried in the high pressure chamber to urge the high pressure annular piston towards its normal position within the brake valve.

12. A power brake valve according to claim 1 including inlet port means defining a fluid passage leading from a remote fluid pressure source to the pressure chambers.

13. A power brake valve according to claim 12 including fluid passage means leading from said inlet means to said low pressure chamber, and check valve means for checking the flow of fluid from the chambers to the inlet means when the pressure in at least the low pressure chamber and fluid passage means exceeds the pressure in the inlet means.

14. A power brake valve according to claim 13 including pilot passage means leading from said high pressure chamber to operating means of the check valve to transmit high pressure fluid to the check valve operating means and open the check valve, whereby to permit the low pressure chamber to be de-pressurized so as to offer minimal resistance to valve rod pulling action when the high pressure chamber is providing high pressure fluid to the brake units.

15. A power brake valve comprising a housing defining a first bore and a second bore, an apertured annular piston slidably disposed within each bore, the aperture defined by each annular piston including a flow space normally permitting power fluid to flow through the annular piston, a plurality of reaction pistons, each reaction piston radially extending to cover the flow space of an adjacent, associated annular piston and move toward that associated annular piston to restrict and halt the normal flow of fluid through the associated annular piston and create a movable end wall, each movable end wall and immediately surrounding bore defining corresponding first and second collapsible chambers in the power valve, the power valve further including a fluid output port communicating with at least one collapsible chamber to direct power fluid from the collapsible chamber toward a brake operating unit when the chamber is collapsed, sequencing means for moving the reaction pistons toward their associated annular pistons and restricting fluid flow through the chamber in a sequential order, and relief means for relieving fluid pressure in the first chamber when the second chamber is pressurized above a predetermined limit.

16. A power brake valve according to claim 15 including a fluid inlet, and a check valve for checking flow of fluid out the inlet when the first and second chambers are substantially equally pressurized.

17. A power brake valve according to claim 16 including pilot port means for leading pressurized fluid from the second chamber to the relief means.

18. A brake system, comprising a pump, a power brake valve including a housing defining a first bore and a second bore located axially adjacent to the first bore, an inlet conduit for leading fluid from the pump to the bores, a bi-ended rod slidable with respect to the bores, an apertured annular piston slidably disposed within each bore, the aperture defined in each annular piston including a flow space normally permitting power fluid to flow through the annular piston, a plurality of reaction pistons carried on the rod, each reaction piston radially extending to cover the flow space of an adjacent, associated annular piston and move toward that associated annular piston to restrict and halt the normal flow of fluid through the associated annular piston and create a movable end wall, each movable end wall and immediately surrounding bore defining a collapsible chamber in the power valve, the power valve further including a fluid output port communicating with at least one collapsible chamber to direct power fluid from the collapsible chamber toward a brake actuating means when the chamber is collapsed, and the system further comprising a priority flow control device for delivering a predetermined fluid pressure to the power brake valve before delivering fluid pressure to other brake system devices.

19. A brake system, according to claim 18 including a power steering unit, and a second priority flow control device for delivering a predetermined fluid pressure to the power steering unit after pressure is delivered to the power brake valve and before delivering fluid pressure to other brake system devices.

20. A brake system according to claim 18 wherein said priority flow control devices is carried on said power valve housing.

21. A brake system according to claim 18 wherein said power brake valve includes an exhaust port, and wherein the brake system includes a receiver and an exhaust line connecting the valve exhaust port to the receiver for returning fluid from the valve to the receiver.

22. A brake system according to claim 21 including conduit means leading from said receiver to said pump to deliver fluid from the receiver to the pump for fluid pressurizing action.

23. A power brake valve comprising a housing defining a first bore of given diameter and a second bore having a smaller diameter than the first bore, a bi-ended rod slidable with respect to at least the first bore, a first apertured annular piston slidably disposed within the first bore, the aperture defined by the annular piston including a flow space normally permitting power fluid to flow through the annular piston, a first reaction piston carried on the rod and radially extending to cover the flow space of the adjacent, associated annular piston and to move toward that associated annular piston to restrict and halt the normal flow of fluid through the associated annular piston and create a movable end wall, the movable end wall and immediately surrounding bore defining a first collapsible chamber in the power valve, second piston means forming with the second bore a second collapsible chamber and movable into the second bore in response to movement of the first piston into the first bore, the power valve further including a fluid output port communicating with at least one chamber to direct power fluid from the collapsible chamber toward a brake actuating means when the chamber is collapsed, and relief valve means for relieving pressure in the first chamber as the second piston means moves into and pressurizes the second chamber, whereby to deliver to the valve fluid output port a first quantity of fluid at a relatively low pressure, and thereafter deliver to the output port a second quantity of fluid at a relatively high pressure.

24. A power brake valve according to claim 23 including a fluid inlet at least partly defined in the valve housing and a check valve for checking flow of fluid out the inlet when the first and second chambers are substantially equally pressurized.

25. A power brake valve according to claim 23 including pilot port means for leading pressurized fluid from the second chamber to operating means of the relief valve means.

* * * * *